No. 862,823.  
PATENTED AUG. 6, 1907.
G. L. HOLMES.  
FILM PACK.  
APPLICATION FILED JAN. 28, 1905.
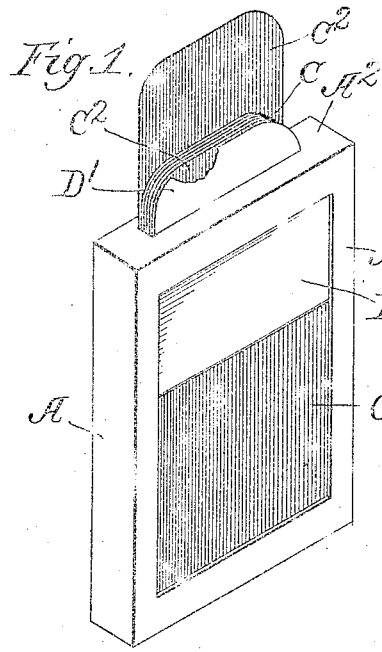
Fig. 1.
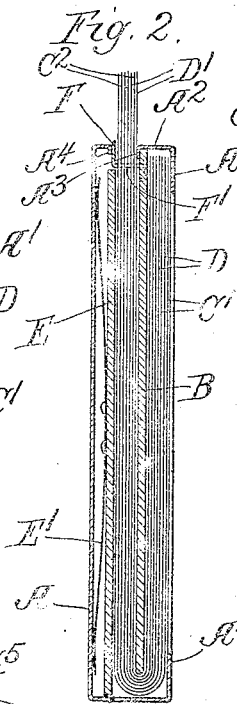
Fig. 2.
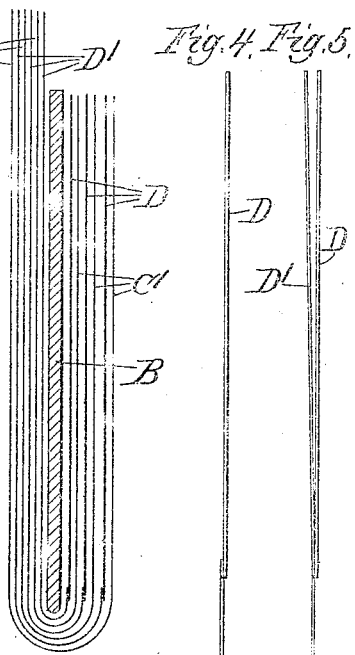
Fig. 3.
Fig. 4. Fig. 5.
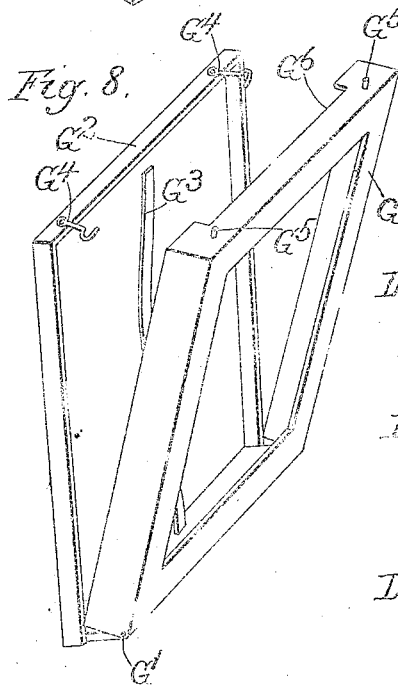
Fig. 8.
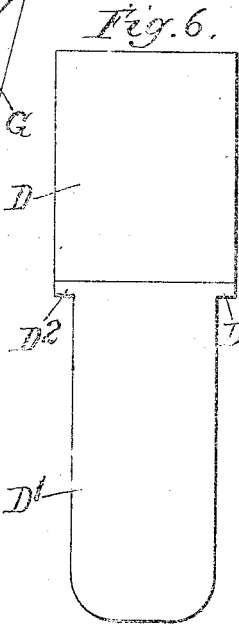
Fig. 6.
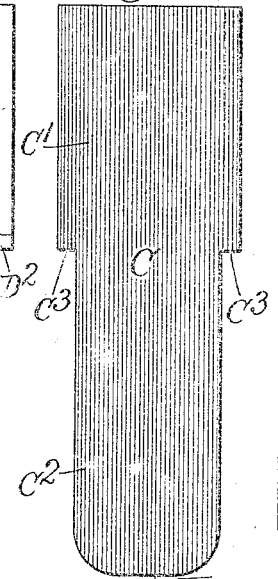
Fig. 7.
Witnesses.  
Edward T. Wray  
Homer Hardy
Inventor.  
George Lewis Holmes  
by Parker Carter  
Attorneys.

UNITED STATES PATENT OFFICE.

GEORGE LEWIS HOLMES, OF CHICAGO, ILLINOIS.

FILM-PACK.

No. 862,823.      Specification of Letters Patent.      Patented Aug. 6, 1907.

Application filed January 28, 1905. Serial No. 243,056.

*To all whom it may concern:*

Be it known that I, GEORGE LEWIS HOLMES, a citizen of the United States, residing at Chicago, in the county of Cook and State of Illinois, have invented a certain new and useful Improvement in Film-Packs, of which the following is a specification.

My invention relates to photographic film packs and has for its object to provide new and improved constructions for devices of that class.

The invention is illustrated in the accompanying drawings wherein

Figure 1 is a perspective view of the pack with the front paper slip partially withdrawn. Fig. 2 is a longitudinal section through the pack. Fig. 3, a diagrammatic view showing in exaggerated longitudinal section a portion of the films and slips; Fig. 4, a longitudinal section through one of the films and tabs spread out flat and exaggerated in thickness; Fig. 5, a like view of a modification; Fig. 6, a plan view of one of the films with its accompanying tab; Fig. 7, a similar view of one of the paper slips, and Fig. 8, a perspective view of the film pack holder or adapter.

Like letters of reference indicate like parts in all the drawings.

The pack consists of a case A, which may be made of paper, card-board, or other material, and is, of course, to be constructed light proof. The front side of this case is formed of the frame work $A^1$ through the aperture of which the films are exposed. The upper side $A^2$ of the casing has an aperture or slot through which the ends of the tabs and slips project. The material of the casing is preferably turned inward at this place as shown at $A^3$ $A^4$ so as to make a light lock.

Within the casing is a floating partition B about which are folded and drawn the films and paper slips. This may be of card board or other material, and is shown somewhat exaggerated in thickness in the drawings for the purpose of better illustration. I have shown one of these paper slips flattened out in Fig. 7, designating it by the letter C. These slips are preferably made of black paper or the like in the form shown, that is, with a rectangular part $C^1$ and a tab part $C^2$, the latter being narrower so as to form the shoulders $C^3$ $C^3$.

In Figs. 4 and 6, I have shown one of the films D with its accompanying tab $D^1$, the latter being secured to the former by gluing or other wise, and having the shoulders $D^2$ $D^2$ as shown. The tabs $D^1$ may be made of paper which can be colored so as to distinguish them from the tabs of the paper slips. A modification of this arrangement is shown in Fig. 5 where the tab $D^1$ extends to full length back of the film D.

The arrangement and operation of the films and the slips is best shown in the diagrammatic view of Fig. 3. As is shown, they are folded around the partition B in alternate order, a paper slip being on the outside of the completed pack. The ends of the slips and also of the tabs attached to the films extend back of the partition B and through the slot in the casing so as to be easily manipulated by the hand.

In order to hold the alternate films and paper slips close together and the front slip or film close against the frame work $A^1$, I provide within the casing A a back plate E having the flat spring $E^1$ which presses against the back of the casing. The slips and the tabs on the films, it will be understood, are successively drawn out through the slot in the casing, thus drawing the rectangular square ends of the paper slips and the films respectively to the back of the pack behind the partition B. The ends of the tabs and slips it is found convenient to tear off as they are drawn out, and for this purpose I have provided the metal cutting strip F which is secured to the partition B by the cross pieces $F^1$, the latter being shown in dotted lines in Fig. 2. These cross pieces serve as stops against which the shoulders of the tabs and slips abut.

In using the film pack of my invention it is not essential to have a holder or adapter. The casing of the pack may be constructed so as to fit into the camera in the place of the usual plate holder, the front paper slip protecting the first film from exposure. However, it may be convenient in some instances to use the pack in connection with the holder or adapter, and I have shown such a device in Fig. 8. It consists of a frame work G hinged at $G^1$ to a back part $G^2$, the latter being provided with the flat spring $G^3$ adapted to hold the film pack in position. The frame may be secured to the back part by the hooks $G^4$ $G^4$ and the staples $G^5$ $G^5$ or in any desired manner. The upper member of the frame work G is cut away as shown at $G^6$ so as to form a slot through which the paper tabs extend.

The casing A, I prefer to make of card board or the like, but any other material would answer the same purpose. Likewise, the slip C and the tabs $D^1$ might be of other material than paper.

The use and operation of my invention are as follows:

When the film pack comes to the user, the first film is covered by the outer paper slip, all of the slips and films being pressed against the frame work $A^1$ so as to prevent the possibility of light leaking in. The film pack may be used with the ordinary plate camera and in a manner similar to the use of plates, that is, the operator may first focus his lens with the aid of a ground glass plate if he chooses. He then inserts the film pack in the place in the camera usually occupied by the plate holder, and taking hold of the paper tab at the back of the bunch of tabs, he pulls it out as far as it will go and tears it off on the cutter F. This uncovers the first film, the film below being protected by the next paper slip. When the exposure has been made, he takes hold of the next paper tab; this one being connected with the film just exposed, and by drawing it out, pulls the film to the back of the pack. If he wishes to make two exposures, when the first film has been exposed, he may take hold of two paper tabs at once and thus draw back simultaneously the front film and the paper slip back of it, thus leaving another film ready to be exposed. By coloring the tabs attached to the films, they may be easily distinguished from the ends of the black paper slips.

The operation of the pack will not be in any manner changed if it is used in connection with a holder or adapter. The pack is merely inserted into the adapter and the adapter used as above described. It will be seen that in my device it is not necessary that the adapter should be light proof or have a shutter with its accompanying light lock, nor indeed, is it essential that the adapter should be used at all. This is a very great advantage insomuch as the expense of a light proof adapter with its shutter and light lock is very considerable.

It will be obvious that the pack may be removed from the camera at any time between exposures and in the day light as each film is protected by the paper slip in front of it.

I claim:

1. A photographic film pack comprising a plurality of films adapted to be successively exposed with a plurality of independent coverings arranged in alternate order therewith.

2. A photographic film pack comprising a plurality of films with a plurality of slips of light proof material arranged in alternate order therewith in combination with means for successively and independently exposing such films and slips.

3. A photographic film pack comprising a plurality of films, with a plurality of independent pieces of light proof material arranged in alternate order therewith in combination with means for successively exposing such films.

4. A photographic film pack comprising a plurality of films with sheets of light proof material arranged in front of each film; means connected with each film for withdrawing it from its exposed position on the pack, and means for independently withdrawing each of such sheets of material from its place in front of its respective film.

5. A photographic film pack comprising a plurality of films each having a paper tab connected therewith, with a plurality of black paper slips one in front of each of the films, such films and slips being arranged so that they may be successively and independently withdrawn from the front to the rear of the pack.

6. A photographic film pack comprising a casing, a partition in such casing, a plurality of alternately arranged films and sheets of light proof material each film and each sheet having a tab part connected therewith, and the whole folded about such partition so that the films and sheets of material may be separately drawn to the back of the partition.

7. A photographic film pack comprising a casing, a partition freely movable in such casing, a plurality of alternately arranged films and sheets of light proof material each having a tab part connected therewith, and the whole folded about such partition in combination with means for holding the films and sheets of material against the front of such casing.

8. A photographic film pack comprising a plurality of alternate films and sheets of light proof material and separate means for manipulating such films and sheets respectively, such pack adapted to be inserted directly in the place of the plate holder of a plate holding camera.

9. A photographic film pack comprising a plurality of films with separate covering for each of the same, such films and coverings therefor being arranged so that when each film is removed from its exposed position on the pack the next succeeding film is left covered.

10. As a new article of manufacture, a photographic holder consisting of a casing, a series of sensitized media, and a series of light-shields for the said sensitized media, the media and shields being sustained within the said casing.

11. The combination with a core-body, of a series of sensitized flexible media, and a series of flexible light-shields for the said media, the latter and the said light-shields being superimposed one on the other and mounted on the said core body.

12. A photographic film pack adapted to be inserted directly in the place of the plate holder of a plate holding camera, the said pack comprising a series of films and a series of temporary light shields for the said films, the said light shields being arranged one in front of each film to protect the same and adapted to be successively removed to expose the films, each light shield retaining its protecting position when the preceding film is removed from its exposed position, whereby the pack can be safely removed from the camera after exposure of a part of the films contained therein.

13. A photographic film pack comprising a plurality of films with means for covering each film, such films and coverings therefor being arranged so that when each film is removed from its exposed position on the pack the next succeeding film is left covered.

14. A photographic film pack comprising a plurality of films with removable means for covering each film, such films and coverings being arranged so that when each film is removed from its exposed position on the pack, the removable covering for the next succeeding film is exposed.

GEORGE LEWIS HOLMES.

Witnesses:
J. W. PLANT,
E. J. WATSON.